US00RE43092E

(19) United States
(12) Reissued Patent
Byrd et al.

(10) Patent Number: US RE43,092 E
(45) Date of Reissued Patent: Jan. 10, 2012

(54) METHOD FOR CONTROLLING SUBSCRIBER ACCESS TO A FEE-BASED SERVICE

(75) Inventors: Sally Byrd, Somerville, NJ (US); Jonathan P. Harwood, Morganville, NJ (US); Suzanne P. Kerr, Madison, NJ (US)

(73) Assignee: AT&T Intellectual Property I, L.P., Atlanta, GA (US)

(21) Appl. No.: 12/861,099

(22) Filed: Aug. 23, 2010

Related U.S. Patent Documents

Reissue of:
(64) Patent No.: 6,069,941
Issued: May 30, 2000
Appl. No.: 08/508,143
Filed: Jul. 27, 1995

(51) Int. Cl.
*H04M 15/00* (2006.01)

(52) U.S. Cl. ..... 379/121.06; 379/111; 379/114.12; 379/114.17; 379/133; 379/134

(58) Field of Classification Search ..... 379/111, 379/112.01–112.04, 114.01–114.19, 115.01–115.02, 379/121.01–121.06, 133, 134, 142.01–142.06
See application file for complete search history.

(56) References Cited

U.S. PATENT DOCUMENTS

| | | | |
|---|---|---|---|
| 4,845,739 | A | 7/1989 | Katz |
| 5,003,584 | A | 3/1991 | Benyacar et al. |
| 5,146,491 | A | 9/1992 | Silver et al. |
| 5,181,238 | A | 1/1993 | Medamana et al. |
| 5,251,252 | A | 10/1993 | Katz |
| 5,311,594 | A | 5/1994 | Penzias |
| 5,327,485 | A | 7/1994 | Leaden |
| 5,341,414 | A | 8/1994 | Popke |
| 5,377,258 | A | 12/1994 | Bro |
| 5,406,619 | A | 4/1995 | Akhteruzzaman et al. |
| 5,415,416 | A | 5/1995 | Scagnelli et al. |
| 5,469,497 | A | 11/1995 | Pierce et al. |
| 5,487,107 | A | 1/1996 | Atkins et al. |
| 5,583,918 | A | 12/1996 | Nakagawa |
| 5,677,945 | A | 10/1997 | Mullins et al. |
| 5,719,926 | A | 2/1998 | Hill |

FOREIGN PATENT DOCUMENTS

| | | |
|---|---|---|
| GB | 2 215 897 A | 9/1989 |
| GB | 2215897 | 9/1989 |

*Primary Examiner* — Vijay Shankar
(74) *Attorney, Agent, or Firm* — Scott P. Zimmerman, PLLC

(57) ABSTRACT

Access by a subscriber (12) to a fee-based service is managed so that the subscriber, when qualified, receives the service. If the subscriber is found unqualified, then the subscriber is prompted to enter qualifying information, either in the form of the identity of a purchased product, or a bank credit card number. Once the subscriber is qualified, then the subscriber receives the service in the same manner as if he or she were initially found qualified.

18 Claims, 2 Drawing Sheets

METHOD FOR CONTROLLING SUBSCRIBER ACCESS TO A FEE-BASED SERVICE

Matter enclosed in heavy brackets [ ] appears in the original patent but forms no part of this reissue specification; matter printed in italics indicates the additions made by reissue.

TECHNICAL FIELD

This invention relates to a technique for managing subscriber access to a fee-based service via a telecommunications network.

BACKGROUND ART

Many companies and institutions offer their customers toll-free telephone access to various services. For example, some manufacturers of computer software provide their customers with no-charge telephone support via a toll-free telephone number (i.e., an 800 number) provided by an interexchange carrier such as AT&T. In many instances, the demand for such no-charge telephone service has placed an enormous financial burden on the companies and institutions providing the service. A growing number of institutions and companies that previously provided service at no charge via a toll-free telephone number are now imposing a charge for such service.

One past approach for rendering a service by telephone on a fee basis has been to impose a fee upon the completion of the customer-initiated call to the provider of the service who has been assigned a 900 number for this purpose. A customer (i.e., a telephone subscriber) who places a telephone call to a 900 number incurs a charge based on the number of minutes of service the subscriber receives. This approach affords little flexibility in terms of providing a certain amount of service at no charge before imposing a fee for additional service. Often, a manufacturer of software, for example, may wish to provide the purchaser with several hours of telephone support without charge.

Presently, most companies and institutions that offer a limited amount of no-charge telephone service do so by providing their customers with some type of qualifier, in the form of a password or Personal Identification Number (PIN), that expires or otherwise becomes invalid after the customer has obtained a prescribed amount of service. To obtain a password or PIN, the customer must usually register with the company or institution offering the service, usually by mail or sometimes, by phone. If the registration occurs by phone, invariably, the customer, once registered must dial a separate number to actually obtain the service.

Once the customer has expended the allocated amount of the service, the customer must call the provider of the service, usually at telephone number different from the one associated with the service itself and sometimes different from the number associated with product registration. Only by calling the number associated with renewal of the service can the customer arrange for payment to obtain additional service. Once the customer has arranged for payment, then he or she would access the service provider in the same manner as before by dialing the number associated with the service itself. The need to dial separate numbers to: (1) obtain a password or PIN, (2) obtain the service itself, and (3) arrange for payment for renewal of the service, is certainly cumbersome.

Thus, there is a need for an improved method for controlling subscriber access to a fee-based service that is not subject to the disadvantage of the prior art.

BRIEF SUMMARY OF THE INVENTION

Briefly, in accordance with the invention, a method is disclosed for controlling subscriber access to a fee-based service. In accordance with the method, the subscriber first establishes a communications link with a call-processing platform, typically by placing a call to a single gateway number. Once the call is completed, the call-processing platform determines whether the subscriber is qualified to receive the desired service. Typically, the call-processing platform establishes a subscriber's qualification by prompting the subscriber to enter an identifier (i.e., a password or PIN) that allows the call-processing platform to determine whether the subscriber is eligible to receive service, and if so, how much. If the subscriber is qualified, then the call-processing platform connects the subscriber to the service while monitoring the amount of the service that is used. Rather than prompt the subscriber to enter a password or PIN, the call-processing platform may establish a subscriber's qualification by ascertaining whether the subscriber caller is calling from a telephone number that has been previously authorized to receive service.

Should the subscriber not be qualified to receive the service, then the subscriber is prompted to enter information, including credit data, that would entitle the subscriber to receive the service. For example, if the subscriber had purchased a product bundled with a limited amount of no-charge support, then the subscriber would enter information identifying the product, such as a product serial number, that would entitle the subscriber to a credit for a certain amount of no-charge service in the future. On the other hand, if the subscriber already had expended an amount of the service that was previously credited, then the subscriber would be prompted to enter a credit card number. In this way, the subscriber would arrange for payment for future service. Once the subscriber has entered the appropriate information to become qualified, the call-processing platform connects the subscriber to the service while monitoring the amount of service being supplied.

The entire process of providing a qualified subscriber with the service, or qualifying an unqualified subscriber and then providing service, occurs during a single telecommunications link (e.g., a single telephone call). In practice, the transaction is handled entirely by the call platform that verifies the qualifications of a subscriber to entitle that subscriber to receive the service. The call platform also prompts an unqualified subscriber to enter information and thereafter verifies such information before qualifying the subscriber for service. If necessary, the call platform may also couple a subscriber at any time to a human agent should manual intervention become necessary.

DETAILED DESCRIPTION

Figure 1:
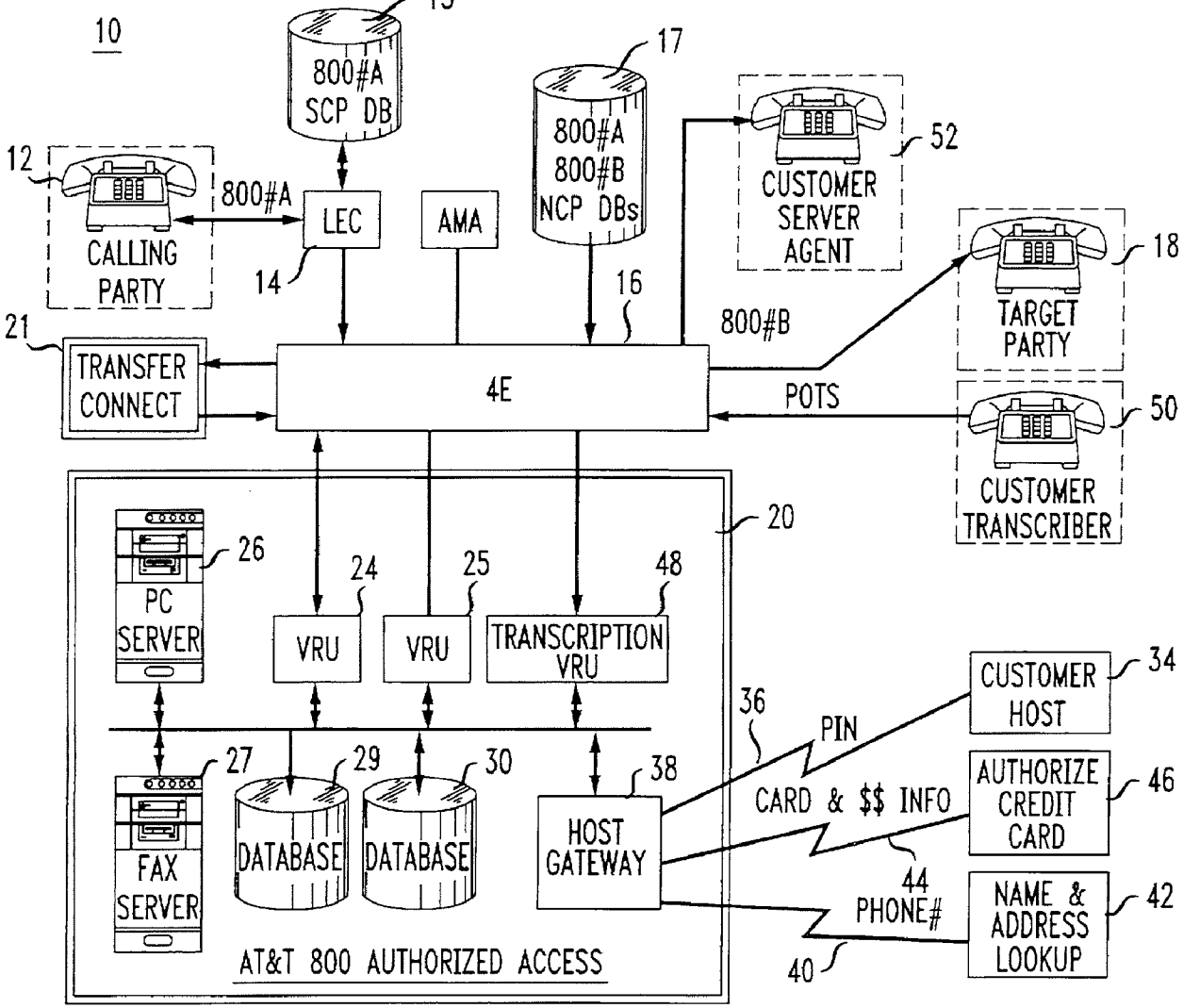
FIG. 1 is a block schematic diagram of a system for controlling subscriber access to a fee-based service in accordance with the method of the invention.

FIG. 1 depicts a telephone network 10 through which a subscriber (i.e., a calling party) 12 may access a service on a fee basis in accordance with the present invention. The type of service may vary. For example, the service may comprise telephone support for a particular piece of computer software. The exact type of service rendered to the subscriber 12 is not critical to the present invention.

To obtain a desired service, the subscriber 12 first dials a telephone number associated with the provider of that service. In the illustrated embodiment depicted in FIG. 1, the service provider is presumed to have a toll-free 800 number. As should be appreciated, the telephone number of the service provider need not be toll free. The call initiated by the subscriber 12 to the service provider first reaches a Local Exchange Carrier (LEC) 14 that provides the subscriber with local access. When the service provider has an 800 telephone number, the LEC 14 accesses a data base 15 containing a set of 800 numbers, designated by the expression "800# A". Using the data base 15, the LEC 14 determines the destination of the call, which in the illustrated embodiment, is an Inter-Exchange Carrier (IXC), such as AT&T. To that end, the LEC 14 delivers the subscriber-initiated call to a gateway switch 16. In practice, the switch 16 comprises an AT&T 4ESS switch, that serves as a Point-Of-Presence (POP) for the IXC within the LEC 14.

Upon receipt of the call, the switch 16 accesses a data base 17 at a network control point. The data base 17 contains routing information that enables the switch 16 to route the call, based upon the #800 number dialed by the calling party 12. For example, the customer dialed number may be intended directly for a target party 18, whereupon the call is routed directly to that party. On the other hand, the calling party 12 may have dialed an #800 number associated with a particular service, such as computer software support managed. In accordance with the invention, such support is managed by a call platform 20, associated either with the IXC, or with the target party 18. In the illustrated embodiment, the call platform 20 is associated with the IXC.

Associated with the switch 16 is a transfer/connect platform 21 that comprises a data processor, for controlling disposition of a customer-initiated call for service received at the switch. The transfer/connect platform 21 either transfers the call or connects it to the call platform 20, depending on whether the IXC is to manage subscriber access to the service provider, via the call platform, or whether a target party 18 is to manage such access through a similar call platform. As mentioned, the number dialed by the calling party 12 determines the call destination. Obviously, for calls that always terminate at the call platform 20 (i.e., calls that never go elsewhere), then the transfer/connect platform 21 would not be necessary.

To enable the IXC to manage subscriber access to the service provider in accordance with the invention the call platform 20 includes at least one, and preferably a pair of Voice Response Units (VRUs) 24 and 25. The platform 20 also may advantageously include a PC server 26, such as AT&T's Electronic Media Networked Service (EMNS) server, and a fax server 27, such as AT&T's Fax Image Recognition SysTem (FIRST) server. The VRUs 24 and 25, the PC server 26, and the fax server 27 are all connected to each other via a network 28 that may comprise a Local Area Network (LAN), a Wide Area Network (WAN) or a TCP/IP network for example.

Each of the VRUs 24 and 25 has the capability of analyzing DTMF data received from the switch 16 from voice terminal (not shown) and the ability to deliver simulated voice responses to voice terminal in accordance with such data analysis. For example, upon receipt of data from the switch 16 indicating that a subscriber-initiated voice call has been connected to the call platform 20, the VRU 24 (or alternatively, the VRU 25) delivers a voice welcome to the subscriber 12. The PC server 26 operates analogously to the VRUs 24 and 25 except that the PC server 26 handles a subscriber-initiated call originating from a personal computer (not shown). Thus, when a subscriber-initiated call originates from a personal computer, the transfer/connect platform 21 routes such a call received at the switch 16 to the PC server 26 that serves to analyze incoming computer-generated data. Thus, upon the receipt of a subscriber-initiating call originating from a computer, the PC server 26 analyzes the incoming data and, thereafter down-loads information to that computer, causing a welcome message to appear on its screen.

The fax platform 27 handles subscriber-initiated calls originating at a fax machine (not shown). Unlike the VRUs 24 and 25 and the PC server 26 that "interact" with the subscriber, the fax server 27 plays a passive role, allowing faxed information to be received at the call platform 20. For example, the fax platform 20 may allow the calling party 12 to fax registration information.

To facilitate further discussion of the call platform 20, the subscriber-initiated call is assumed to originate from either a voice terminal, or a computer. Once the subscriber initialed call is connected to the call platform 20 and the subscriber is welcomed as described, then for a voice call, one of the VRUs 24 and 25 prompts the subscriber 12 to enter a subscriber-qualifier via DTMF data. The subscriber qualifier typically takes the form of a password or a PIN indicating that the subscriber is authorized to receive the desired service. For a subscriber-initiated call originating at a personal computer, the PC server 26 will likewise prompt the caller to enter an appropriate password or PIN.

Upon receipt of the subscriber password or PIN, the active one of the VRUs 24 and 25 or the PC server 26 accesses one of a pair of data bases 29 and 30 through the network 28 to obtain the account records associated with the password or PIN. (Note that while a pair of data bases 29 and 30 have been shown, a single data base could be employed.) From the information contained in the accessed one of the data bases 29 and 30 (or from the lack of such information), the active one of the VRUs 24 and 25 or the PC server 26 can verify whether the subscriber 12 is qualified to receive the desired service, and if so, how much of the desired service the subscriber may receive. Once the active one of the VRUs 24 and 25 or the PC server 26 has verified that the subscriber is entitled to receive the desired service, the VRU or the PC server signals the transfer/connect platform 21 to transfer the subscriber-initiated call via the switch 16 to a target party 18 providing the service desired by the subscriber 12. While the subscriber 12 receives the desired service from the target party 18, an Automated Message Accounting unit 33, which is well known in the art, monitors the length of the call to account for billing purposes.

Rather than store the subscriber account information within one of the data bases 29 and 30 in the call platform 20, the service provider may wish to maintain its own data base of subscriber qualification information in a host computer 34. Under such circumstances, a telecommunications link 36, such as a dedicated digital service line, is provided to couple the host 34 to a host gateway 38 within the call platform 20 for interfacing the host to the net work 28. In practice, the host gateway 38 provides an appropriate protocol, such as the IBM 3270 protocol for example.

In some instances, it may be desirable to qualify the subscriber in accordance with the subscriber's telephone number. To that end, the host gateway 38 of the call platform 20 is coupled by a telecommunications link 40 (e.g., a dedicated digital service line) to a data base 42 containing subscriber telephone numbers, names and addresses. By accessing the data base 42, the active one of the VRUs 24 and 25 or the PC server 26 can cross-reference the subscriber's telephone number to a corresponding name and address in order to establish if the subscriber is qualified. The name and address obtained from the data base 42 can be cross-referenced to a listing of qualified subscribers within one of the data bases 29 or 30, or within the host 34, to establish whether the subscriber is qualified receive the desired service. (Note that the data base 42 could also be provided with information concerning each subscriber's account, thereby obviating the need to access the appropriate one of the data bases 29 and 30.)

In some instances, the subscriber initiating the call to the service provider may not be qualified to receive the desired service. For example, the subscriber 12 may be the purchaser of a new software product and has not yet registered the product. Thus, the subscriber has no password or PIN. Alternatively, the subscriber 12 may have expended the amount of service previously allocated with the purchase of a software product. Thus, the subscriber's account has an insufficient balance to allow the subscriber to obtain additional service. In either event, the subscriber must 12 must now become qualified. In the past, the subscriber 12 could not become qualified by accessing the service provider through the same telephone number that a qualified subscriber would dial to receive service. Rather, a unqualified subscriber had to manually register the product, either by mail or by telephone before becoming qualified.

In accordance with the invention, the call platform 20 advantageously can qualify an unqualified subscriber 12 and provide the desired service thereto in the same manner that the platform provides the desired service to a qualified subscriber. To understand how the call platform accomplishes such subscriber qualification, assume that the subscriber 12 who initiated the call to the service provider has an insufficient account balance to obtain additional service. When such a subscriber calls a service provider that has chosen an IXC to manage subscriber access in accordance with the invention, the call is received at the switch 16 and is thereafter transferred to the call platform 20 in the same manner as before. Upon receipt of the call at the call platform 20, the active one of the VRUs 24 and 25 or the PC server 26 welcomes the subscriber and thereafter prompts the subscriber to enter a password or PIN. Following receipt of the password or PIN, the active one of the VRUs 24 and 25 or the PC server 26 accesses the appropriate one of the data bases 29 and 30 (or the host 34). Upon accessing the appropriate one of the data bases 28 and 30 or the host 34, the active one of the VRUs 24 and 25 or the PC server 26 would learn that the subscriber 12 has an insufficient account balance. Accordingly, the active one of the VRUs 24 and 25 or the PC server 26 would alert the subscriber of this fact and then prompt the subscriber to enter data, including credit information, in order to become qualified to receive the desired service.

As part of the prompting message to the subscriber 12, the active one of the VRUs 24 and 25 or the PC server 26 may provide the subscriber with the option of entering qualifying data, including credit information. Thus, a subscriber 12 who knows his or her account balance is insufficient can avoid the delay associated with accessing the appropriate one of the data bases 29 and 30 or the host 34 to check the subscriber's account.

Normally, the credit information provided by the subscriber 12 takes the form of a credit card number, such as an AT&T Universal Credit Card number, although the credit information could take other forms as will be discussed below, In practice, the call platform 20 usually does not have information about credit card numbers. For that reason, a data link 44, in the form of a digital data line, is provided to couple the host gateway 38 to a data base 46 of credit information maintained by a bank or other credit provider. Thus, after a subscriber enters a credit card number, the active one of the VRUs 24 and 25 or the PC server 26 accesses the data base 46 to verify the credit card number. If valid, the subscriber's credit card is then debited in an amount authorized by the subscriber. Once the subscriber 12 has been qualified in this manner, then the transfer/connect platform 18 transfers the subscriber's call to the target party 22 providing the desired service.

Assume now that the subscriber 12 has not yet been assigned a password or PIN. For example, the subscriber 12 may have just purchased a piece of software and has not yet registered it. However, the subscriber now wants to obtain telephone support bundled with the software. Under such circumstances, the subscriber 12 calls the service provider at the same number as if the subscriber were qualified. Again, the subscriber's call is received at the switch 16. Assuming that the service provider has chosen the IXC to manage subscriber access in accordance with the invention, the transfer/connect call platform 21 connects the subscriber's call to the call platform 20. In response to the call, an active one of the VRUs 24 and 25 or the PC server 26 welcomes the subscriber 12 and prompts the subscriber to enter a password or PIN as before, As part of the prompt to the subscriber 12, the active one of the VRUs 24 and 25 or the PC server 26 also provides an option to allow the subscriber to register the product. Once the subscriber selects this option, the subscriber is prompted to enter the necessary information identifying the purchased product, such as the product serial number, to become qualified. As may be appreciated, when the subscriber initially undertakes to become qualified by registering the purchased product, the product identity (i.e., its serial number) serves as the "credit" information to initially fund the subscriber's account. The information entered by the subscriber 12 in connection with product registration is typically stored in a transcription VRU 46 within the call platform 20 having the capability of recording the subscriber-entered registration information. The registration information stored in the transcription VRU 46 may be accessed by a customer transcriber 50 (i.e., a computer maintained by the product manufacturer) that communicates with the call platform 20 by calling a pre-assigned POTS routed to the switch 16. Similarly, faxed registration information, previously received via the fax server 27, could also be obtained in this manner.

Once the subscriber enters the requested registration information, the active one of the VRUs 24 and 25 or the PC server 26 verifies this information by accessing the appropriate one of the data bases 29 and 30, or by accessing the host 34, depending on where the verification data is stored. Once the subscriber entered information is verified, then the active one of the VRUs 24 and 25 or the PC server 26 establishes an account for the subscriber and thereafter signals the transfer/connect platform 21 to transfer the subscriber call to the target party 22 providing the desired service.

Ordinarily, the active one of the VRUs 24 and 25 or the PC server 26 communicates with the subscriber 12 during the above-described process. However, in some instances, a subscriber may wish to talk to a live person. Under such circumstances, the subscriber would enter an appropriate command, whereupon the active one of the VRUs 24 or 25 or the PC server 26 would signal the transfer/connect platform 21 to transfer the call to the switch 16 for routing to a customer service agent 52 at the service provider premises.

Figure 2:
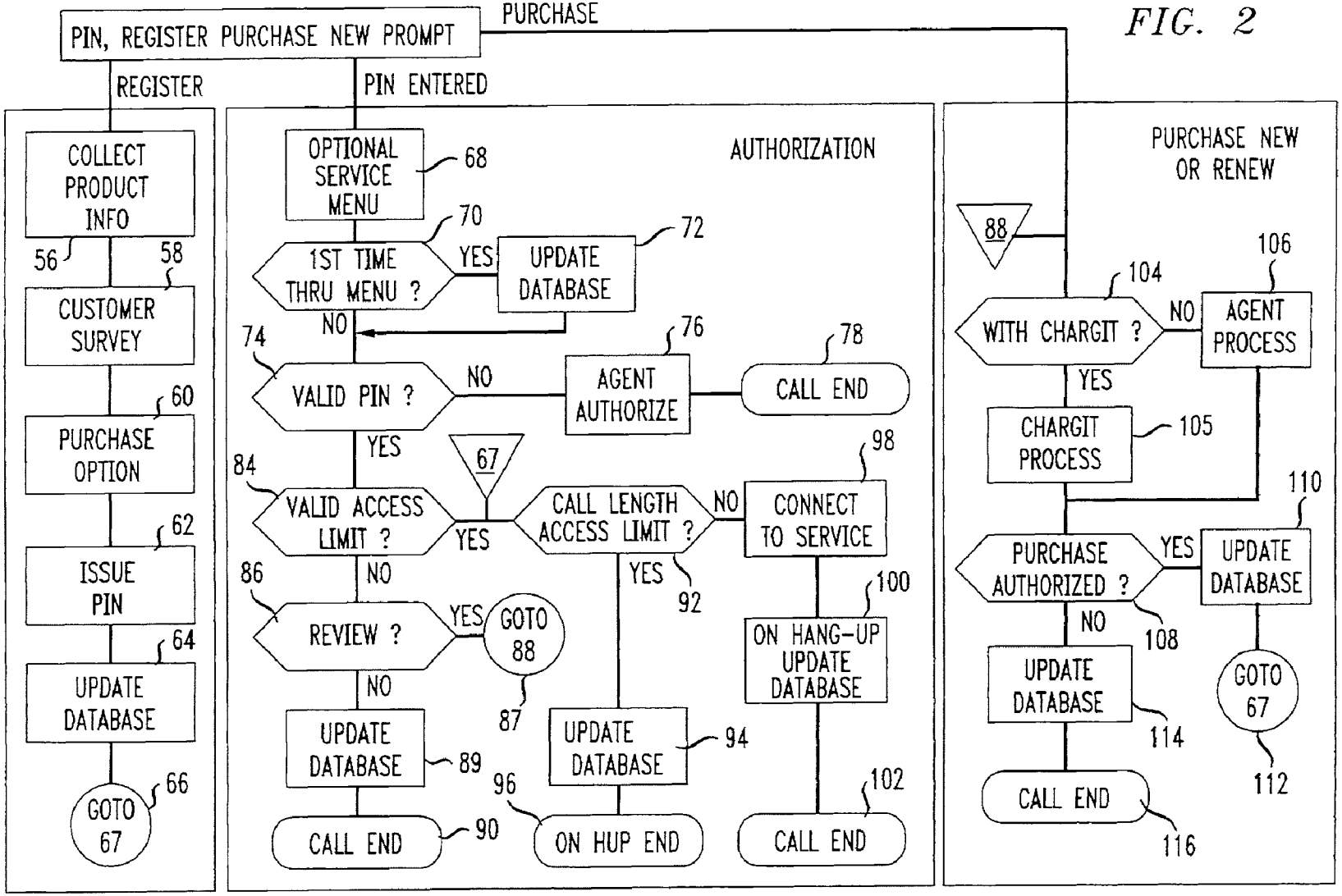
FIG. 2 is a flowchart diagram depicting the steps of the method of the invention for controlling subscriber access to a fee-based service.

A flowchart depiction of subscriber call flow in accordance with the invention is illustrated in FIG. 2. As seen in FIG. 2, a subscriber-initiated call to the service provider, once received at the call platform 20 of FIG. 1, initially triggers one of VRUs 24 and 25 or the PC server 26 of FIG. 1 to generate a prompt (step 54). Among other messages, the prompt generated during step 54 of FIG. 2 requests that the subscriber designate one of three choices: (1) enter a password or PIN, (2) register a product and receive a password or PIN, or (3) purchase additional service. Following the prompt, the subscriber 12 of FIG. 1 enters a response that determines whether a registration sequence, an authorization sequence or a purchase/renewal is executed.

Assume that in response to the prompt generated during step 54, the subscriber designates the product registration option, thereby triggering the product registration sequence. Upon execution of the product registration sequence, step 56 is executed, whereupon the subscriber 12 of FIG. 1 is initially prompted to enter product information (e.g., the product serial number) that is later collected and stored. Following step 56, step 58 is executed, whereupon the subscriber is prompted to enter certain survey information that may be helpful for marketing purposes. After entry and collection of the survey information, step 58 is executed and the subscriber is prompted to purchase additional service if desired.

Following step 58 step 60 is executed, whereupon the subscriber receives a password or PIN. Note that step 60 could be executed directly following step 54, since steps 56 and 58, although desirable, are nevertheless not critical to managing subscriber access to the service. After issuance of the password or PIN during step 60, the appropriate data bases are updated during step 64. Thereafter, the subscriber-initiated call branches (step 66) to a branch point (67) within the authorization sequence to be described hereinafter.

Assume that during step 54, the subscriber 12 of FIG. 1 has chosen the authorization sequence and now enters a password or PIN. Upon entry of a password or PIN, the subscriber 12 is offered an optional service menu (step 68), whereupon the subscriber is first prompted (step 70) to indicate whether this is the first time the subscriber has proceeded through the menu. If so, step 72 is executed and one of the data bases 24 and 25 or the PC server 26 of FIG. 1 is updated to reflect that this is the first time that the subscriber has entered the authorization sequence.

Following step 72 (or following step 70 if the subscriber has previously entered the authorization routine), step 74 is executed, and a determination is made whether the subscriber-entered password or PIN is valid. (Note that step 74 could have been executed immediately after step 68 if no record is to be kept of whether the subscriber has ever entered the authorization routine.) If the subscriber-entered password or PIN is not found or is compromised, then step 76 is executed, and the caller is prompted either to invoke the automated authorization process described or to reach the customer service agent 52 of FIG. 1. After the call is transferred to the agent, the call ends (step 78). The agent may thereafter update the appropriate data base in a separate transaction (not shown).

Assume now that the subscriber 12 of FIG. 1 was found to have a valid password or PIN during step 74. Under this condition, step 84 is executed, and a determination is made whether the subscriber has a valid access limit. In other words, during step 84 of FIG. 2, a determination is made whether the subscriber 12 has sufficient credit to entitle the subscriber to access. If so, program execution branches to branch point 67. Otherwise, step 86 is executed, whereupon the subscriber is prompted to renew (i.e., to pre-pay to obtain additional service). If the subscriber chooses to renew, then step 87 is executed, whereupon the call branches to branch point 88. Should the subscriber 12 choose not to renew during step 86, then step 89 is executed, and the appropriate data base is updated and thereafter the call is ended (step 90).

If the subscriber 12 of FIG. 1 is determined to have a valid access limit during step 84, then the call proceeds to branch point 67 whereupon a determination is made (step 92) whether a call count access limit is reached. Under some circumstances, it may be desirable to limit the number of accesses that a subscriber 12 may make within a certain time period and to that end, step 92 is executed after a call reaches branch point 67. If, upon execution of step 92, a determination is made that the call count limit of a subscriber has been reached, then step 94 is executed, whereupon the appropriate data bases are updated. Following step 94, the call ends (step 96).

In addition to limiting the number of subscriber accesses, it may also be desirable to limit the length of service a subscriber may receive. Thus during step 92, it may be desirable to check the cumulative amount of service (i.e., call minutes) a subscriber has thus far received. If the subscriber has already received the maximum amount of service allowed, then steps 94 and 96 are executed as described.

Should the call count limit be below the prescribed limit during step 92 (and the amount of service thus far provided is below the maximum service limit), then the subscriber is connected to the service (step 98). Note that if no limits are to exist on the number of accesses or on the amount of service provided, then step 98 could be executed, after executing (step 86) and determining that the subscriber had a valid password or PIN. Once the subscriber ends the service following the connection made during step 98, then, upon call hang-up, the appropriate data bases are updated (step 100), whereupon the call ends (step 102).

The routine associated with purchase/renewal of service begins at branch point 88 which is reached either during step 54, or after step 87. At branch point 88, the subscriber is prompted to decide whether he or she wishes to debit his or her credit card (step 104). If so, step 105 is executed and the subscriber's credit card is debited to the extent authorized by the subscriber. Should the subscriber not wish to proceed with debiting his or her card, step 106 is executed and an agent (e.g., the agent 52) now intervenes to assist the subscriber. Following steps 105 or 106, a determination is made (step 108) whether the subscriber has indeed successfully made a purchase/renewal. If so, then the appropriate data bases are updated accordingly and program execution branches (step 112) to branch point 67 as previously described. Should the subscriber's purchase/renewal not be authorized, the appropriate data bases are updated accordingly (step 114) and the call is ended (step 116).

Although not part of the call flow routine of FIG. 2, it should be appreciated that various information, including credit card data, is collected by the call platform 20 of FIG. 1 during the call flow routine of FIG. 2. The target party 18 may receive this data in a variety of ways. For example, such data may be transferred to the customer host 34. Alternatively, the active one of the VRUs 24 and 25, or the PC server 26, could transfer subscriber-entered data to the target party 18 via an ISDN link (not shown).

As may be appreciated from the foregoing description, a method has been described for controlling a qualified subscriber's access to a fee-based service, and for enabling an unqualified subscriber to become qualified and receive service.

It is to be understood that the above-described embodiments are merely illustrative of the principles of the invention. Various modifications and changes may be made thereto by those skilled in the art which will embody the principles of the invention and fall within the spirit and scope thereof. For example, the method of the invention has been discussed in terms of controlling telephone access of subscriber to a fee-based service. The method is equally applicable for controlling access by other types of telecommunications equipment, such as computer terminals and set-top boxes.

What is claimed is:

1. A method for providing a subscriber with a fee-based service during a telephone call if the [caller] *subscriber* is qualified, and affording the subscriber, if unqualified, the opportunity to become qualified during the [same] call to obtain the service, comprising the steps of:

(a) verifying *during the call* whether the subscriber is qualified to receive the service [during said call];

(b) providing the subscriber with the service *during the call*, when the subscriber is found to be qualified to receive the service, while accounting for [how much] *a length of* service the subscriber is receiving;

(c) prompting the subscriber during [said same] *the* call, when the subscriber is not qualified to receive the service, to enter qualifying information, including credit data, that would entitle the subscriber to receive the service;

(d) processing the qualifying information to verify whether the information is correct and, if so, then qualifying the subscriber to receive the service; and (e) repeating step (b).

2. The method according to claim 1 wherein the step of verifying whether the subscriber is qualified includes, the steps of:

prompting the subscriber to provide a subscriber-qualifier [in the form of] *associated with at least one of* a password [or PIN] *and a personal identification number*; and comparing the subscriber-qualifier to a list of valid subscriber-qualifiers to determine whether the subscriber is qualified.

3. The method according, to claim 1 wherein the step of qualifying the subscriber includes the steps of:

establishing a subscriber identity based on a telephone number associated with the subscriber; and determining, from the subscriber identity, whether the subscriber is qualified.

4. The method according to claim 1 wherein the step of verifying whether the subscriber is qualified includes the step of verifying whether the subscriber has sufficient credit to entitle the subscriber to receive the service.

5. The method according to claim 4 wherein the step of verifying whether the subscriber is qualified includes the step of determining whether the subscriber has obtained access to the service more than a prescribed number of times within a pre-determined interval.

6. The method according to claim 1 wherein the credit data entered by the subscriber includes [the] *an* identity of a product purchased by the subscriber.

7. The method according to claim 1 wherein the credit data entered by the subscriber includes a credit card number.

8. The method according to claim 1 further including the step of recording the qualifying information entered by the subscriber.

9. The method according to claim 1 wherein the subscriber is prompted to enter survey information in addition to the qualifying information.

10. In a telephone network wherein a telephone subscriber seeking access to a desired fee-based telephone service obtains such access by placing a telephone call to the service provider, a method for controlling access to the service provider by the subscriber, comprising the steps of:

(a) routing the [subscriber's] call to a gateway toll switch of an inter-exchange carrier wherein the call terminates;

(b) connecting the call terminating at the switch to a call platform;

(c) processing the call at the call platform to verify whether the subscriber is qualified to receive the service;

(d) transferring the subscriber call to the service provider so the subscriber receives the [desired] service therefrom when the subscriber is found to be qualified, while accounting for [how much] *a length of* service the subscriber is receiving;

(e) prompting the subscriber during the call, when the subscriber is not qualified to receive the [desired] service, to enter qualifying information, including credit data, that would entitle the subscriber to receive the service;

(f) processing the qualifying information at the call platform [during the call] to verify whether the information is correct and, if so, then qualifying the subscriber to receive the service *during the call*; and (g) repeating step (d).

11. The method according to claim 10 wherein the step of processing the call to verify whether the subscriber is qualified includes the steps of:

prompting the subscriber to provide a subscriber-qualifier [in the form of] *associated with at least one of* a password [or PIN] *and a personal identification number*; and comparing the subscriber-qualifier to a list of valid subscriber-qualifiers to determine whether the subscriber is qualified.

12. The method according to claim 10 wherein the step of processing the call to verify if the subscriber is qualified includes the steps of:

establishing a subscriber identity based on a telephone number associated with the subscriber; and determining, from the subscriber identity, whether the subscriber is qualified.

13. The method according to claim 10 wherein the step of processing the call to verify whether the subscriber is[;] qualified includes the step of verifying whether the subscriber has sufficient credit to entitle the subscriber to receive the service.

14. The method according to claim 13 wherein the step of processing the call to verify whether the subscriber is qualified includes the step of determining whether the subscriber has obtained access to the service more than a prescribed number of times within a pre-determined interval.

15. The method according to claim 10 wherein the credit data entered by the subscriber includes [the] *an* identity of a product purchased by the subscriber.

16. The method according to claim 10 wherein the credit data entered by the subscriber includes a credit card number.

17. The method according to claim 10 further including the step of recording the qualifying information entered by the subscriber.

18. The method according to claim 10 wherein the subscriber is prompted to enter survey information in addition to the qualifying information.

* * * * *